Dec. 24, 1963

F. C. YAO 3,115,584

SELF-RESETTING NEGATIVE RESISTANCE DIODE INVERTER CIRCUIT

Filed Dec. 27, 1960

INVENTOR.
Frank C. Yao
BY John V. Regan
ATTORNEY

United States Patent Office 3,115,584

Patented Dec. 24, 1963

3,115,584
SELF-RESETTING NEGATIVE RESISTANCE DIODE INVERTER CIRCUIT

Frank C. Yao, Philadelphia, Pa., assignor to Radio Corporation of America, a corporation of Delaware Filed Dec. 27, 1960, Ser. No. 78,756
3 Claims. (Cl. 307—88.5)

The present invention relates to a negative resistance diode inverter and is useful, for example, in logic circuits for computers.

The object of this invention is to provide an improved negative resistance diode pulse inverter circuit which is self-resetting, uncomplicated and capable of relatively high speed operation.

The inverter includes a voltage controlled negative resistance element such as a tunnel diode, a current source coupled at one terminal to one electrode of the tunnel diode for quiescently biasing the diode to one of its stable states and a differentiating circuit connected between the other terminal of the current source and the other electrode of the tunnel diode. The input pulses to be inverted are applied to the differentiating circuit in a sense to switch the tunnel diode to its second stable state and then back to its original stable state. The output inverted pulses may be taken from a point in the circuit between the tunnel diode and the current source.

The invention is described in greater detail below and is illustrated in the following drawing of which:

Figure 1:
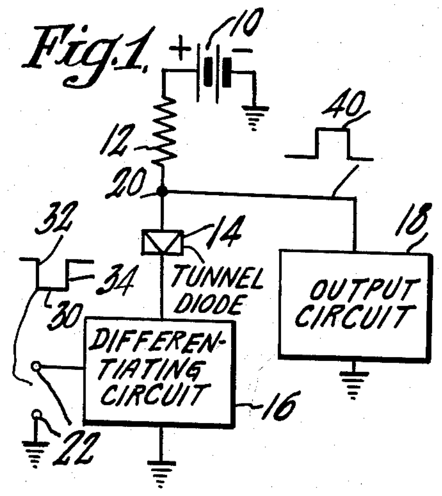
FIG. 1 is a block and schematic circuit diagram of an inverter according to the present invention.

The circuit of FIG. 1 includes a current source shown as a battery 10 in series with a resistor 12. A tunnel diode 14 and a differentiating circuit 16 are connected to the current source. An output circuit, shown as a block 18, is connected from terminal 20, which in the present instance is the anode of the tunnel diode, and ground. The input terminals to the circuit are shown at 22.

Figure 2:
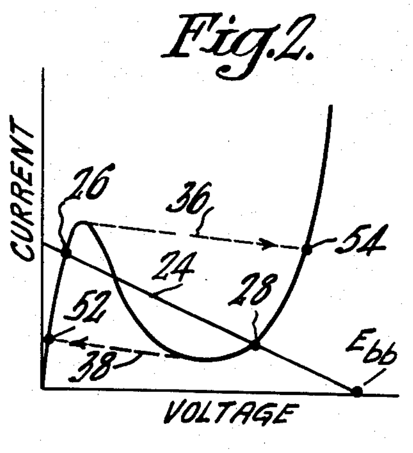
FIG. 2 is a characteristic of current versus voltage of the tunnel diode of FIG. 1 to explain the operation of the circuit of FIG. 1.

The characteristic of forward current versus voltage for tunnel diode 14 is shown in FIG. 2. The load line for the circuit formed by the current source is illustrated at 24. The value of resistance 12 and the voltage provided by battery 10 are such that the tunnel diode 14 is biased to be bistable. In other words, the diode can operate stably in its low voltage state, as indicated by intersection 26, or its high voltage state as indicated by intersection 28.

In operation, it may be assumed that the tunnel diode 14 is quiescently biased to operate in its low voltage state as represented by operating point 26 in FIG. 2. A negative input pulse 30 (FIG. 1) is applied to input terminals 22. The differentiating circuit differentiates this pulse and produces a negative pulse in time coincidence with the leading edge 32 of pulse 30 and a positive pulse in time coincidence with the lagging edge 34 of input pulse 30. These pulses are applied to the cathode of the tunnel diode. A negative pulse applied to the cathode of the tunnel diode is in a sense to produce forward current flow through the tunnel diode. The amplitude of the negative pulse resulting from the differentiation is sufficient to switch the diode operating point from 26 to an operating point in the high voltage state. The switching occurs along a path such as the dashed line 36 in FIG. 2.

After the diode has switched to the high voltage state and before the positive pulse coincident with the lagging edge of pulse 30 arrives, the diode operating point stabilizes at the stable high voltage operating point 28. The positive pulse resulting from the differentiation then occurs and it is applied to the cathode of the tunnel diode. Such a pulse is in a sense to produce current flow in the reverse direction in the tunnel diode. The effect is to switch the tunnel diode operating point from 28 to an operating point 52 in its low voltage state. The switching occurs along a path such as the dashed load line shown at 38. Thereafter, the operating point returns to operating point 26—the low voltage stable intersection between load line 24 and the tunnel diode characteristic.

Summarizing the operation above, a negative input pulse applied to input terminals 22 produces a positive output pulse 40 at the output circuit 18. The two pulses are substantially in time coincidence. If the tunnel diode is a germanium tunnel diode, the input pulse may extend from zero volts to perhaps —100 millivolts or more. The output pulse in this case may extend from a base line of 30 to 40 millivolts to a peak value of perhaps 350 to 400 millivolts and then return to 30 or 40 millivolts.

Figure 3:
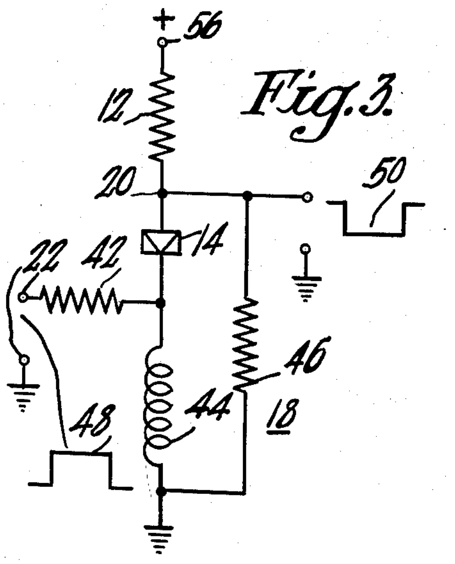
FIG. 3 is a schematic circuit diagram of one form of tunnel diode inverter according to the invention.

A more specific form of the present invention is shown in FIG. 3. Similar reference numerals are applied to similar elements in FIG. 3 as in FIG. 1. The differentiating circuit 16 consists of a resistor 42 and an inductance 44 in series with input terminal 22 and the inductance 44 in series with the tunnel diode 14 and the current source resistance 12. The output circuit 18 is shown as a resistor 46. An important advantage of this circuit is that the element (inductance 44) in series with the tunnel diode 14 has substantially no D.C. resistance and accordingly dissipates little of the power available. An alternative circuit (not shown) includes a capacitor in place of resistor 42 and a resistance in place of inductance 44, however, this alternative circuit does not have the above advantage.

In a practical circuit according to FIG. 3, the time constant of resistor 42 and inductance 44 should be sufficiently short to produce positive and negative pulses of steep rise times. This permits the circuit to produce an inverter output pulse with relatively steep leading and lagging edges. Also, the resistor 42 should be sufficiently small so that there is little attenuation of the input signal which normally is at a low power level.

In the circuit of FIG. 3, tunnel diode 14 is quiescently biased to operate in its high voltage state as, for example, operating point 28 in FIG. 2. The input pulse 48 to the circuit is accordingly of positive polarity and the output pulse 50 of the circuit is of negative polarity. The operation is in other respects similar to that of the circuit already described. A positive pulse which is derived from the leading edge of pulse 48 switches tunnel diode 14 to its low voltage state and a negative pulse which is derived from the lagging edge of pulse 48 switches the tunnel diode back to its original, that is, its high voltage state. Since current cannot change rapidly through inductance 44 when the tunnel diode switches from one state to another, the tunnel diode "hangs" at the same value of current for a short interval of time before returning to a stable operating point defined by the intersection of load line 24 and the tunnel diode characteristic. For example, when the tunnel diode switches from operating point 28 to point 52 in the low voltage state, it remains there for a short interval before returning to operating point 26. The same thing occurs when switching from operating point 26 along dashed line 36 to point 54 in the high voltage state. This is advantageous as the added current (the difference between the current at 54 and the current at 28, for example) is available for driving the load.

Figure 4:
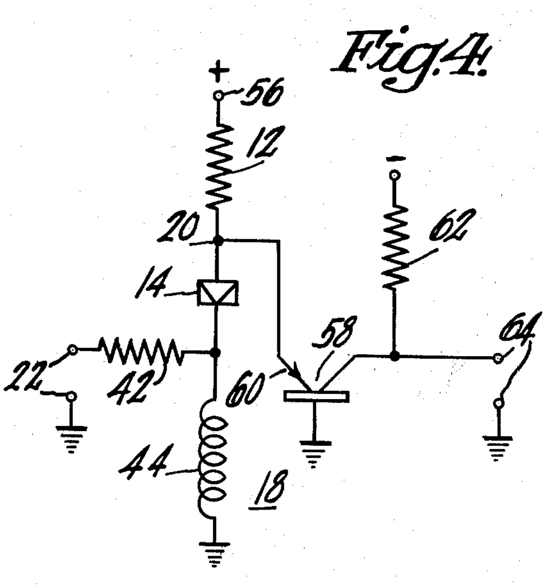
FIG. 4 is a schematic circuit diagram of another form of tunnel diode inverter according to the invention.

A practical circuit according to FIG. 3 may have the following component values:

Resistor 42—50 ohms
Resistor 12—1,000 ohms
Reistor 46—270 ohms
Inductance 44—0.3 microhenries
Bias voltage applied to terminal 56—9 volts
Tunnel diode 14—gallium arsenide having a 10 milliampere current peak In the circuit of FIG. 4 the output circuit 18 includes a transistor 58 the emitter of which is connected to the anode of tunnel diode 14. The collector of the transistor is connected through a load resistor 62 to a power supply voltage indicated schematically by the minus sign. The base of the transistor is connected to ground. The transistor output current is available at terminals 64.

The operation of the circuit is similar to that of the ones already described. When tunnel diode 14 is quiescently biased in the high voltage state, the inverter will invert positive input pulses; conversely, when the tunnel diode is initially biased in its low voltage state, the inverter will invert negative input pulses. An important advantage of the circuit of FIG. 4 is that it is capable of "fanning out" to a relatively large number of subsequent logic stages. The circuit of FIG. 4, for example, can easily drive five or more tunnel diode "and" or "or" gates which may be connected in parallel to output terminals 64.

In the circuits discussed above, the tunnel diode is connected at its anode to a positive current source. It will be appreciated, of course, that the tunnel diode can be reversed and connected at its cathode to a negative current source. With the diode reversed, an NPN transistor would be employed. Also, although not shown, it may be desirable slightly to reverse bias the base of transistor 58 to ensure that the transistor produces no current output when the tunnel diode 14 is in its low voltage state.

What is claimed is:

1. A tunnel diode inverter comprising, in combination, a tunnel diode; a current source coupled at one terminal to one electrode of the tunnel diode for quiescently biasing the diode to one of its stable voltage states; a differentiating circuit a portion of which is connected between the other terminal of said source and the other electrode of the tunnel diode, said circuit including an inductor in series between said other electrode of the tunnel diode and said other terminal of said source and a resistor connected at one terminal to said other electrode of said tunnel diode and adapted to receive an input pulse to be inverted at its other terminal; and an output terminal at said one electrode of said tunnel diode.

2. A tunnel diode inverter comprising, in combination, a tunnel diode; a current source for supplying current to the tunnel diode at a level such that bistable operation is possible coupled at one terminal to one electrode of the tunnel diode; an inductor connected between the other terminal of the source and the other electrode of the tunnel diode; a resistor connected at one terminal to said other electrode of the tunnel diode and adapted to receive an input signal at its other terminal, said resistor and inductor together forming a differentiating circuit; and a pair of output terminals one at said one electrode of said tunnel diode and the other at said other terminal of said source.

3. A tunnel diode inverter comprising, in combination,
a tunnel diode;
a current source for supplying current to the tunnel diode at a level such that bistable operation is possible coupled at one terminal to one electrode of the tunnel diode;
an inductor connected between the other terminal of the source and the other electrode of the tunnel diode;
a resistor connected at one terminal to said other electrode of the tunnel diode and adapted to receive an input signal at its other terminal, said resistor and inductor together forming a differentiating circuit; and
a transistor connected at its emitter to said one electrode of said tunnel diode and connected at its base to said other terminal of said source.

References Cited in the file of this patent

UNITED STATES PATENTS

| | | |
|---|---|---|
| 2,418,127 | Labin | Apr. 1, 1947 |
| 2,647,995 | Dickinson | Aug. 4, 1953 |
| 2,662,979 | Farren et al. | Dec. 15, 1953 |
| 2,944,164 | Odell et al. | July 5, 1960 |
| 2,975,377 | Price | Mar. 14, 1961 |

OTHER REFERENCES

Hurley: "Junction Transistor Electronics," John Wiley & Sons, Inc., New York, pages 410 and 411, FIGURE 20.30.

Dept. of the Army Tech. Manual TM 11–672, October 1951, pp. 34–40.

"The Tunnel Diode as a Logic Element," by Lewin et al., 1960, International Solid-State Circuits Conference Digest of Technical Papers, published February 1960, pages 10 and 11.

"Properties of Esaki Diodes," by Dacey, pages 6 and 7 of same publication cited immediately above.

"Tunnel Diode Logic Circuits," by Chow Electronics, June 24, 1960, pages 103 to 107.

"Germanium and Silicon Tunnel Diode-Design Operation and Application," by Lesk et al., 1959 Wescon Convention Record Part 3, pages 9 to 31, August 1959.